(12) United States Patent
Barga et al.

(10) Patent No.: US 7,386,557 B2
(45) Date of Patent: Jun. 10, 2008

(54) PERSISTENT CLIENT-SERVER DATABASE SESSIONS

(75) Inventors: Roger Barga, Kirkland, WA (US); David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 10/920,629

(22) Filed: Aug. 18, 2004

(65) Prior Publication Data

US 2005/0021514 A1    Jan. 27, 2005

Related U.S. Application Data

(62) Division of application No. 10/128,053, filed on Apr. 22, 2002, now Pat. No. 6,801,914, which is a division of application No. 09/268,240, filed on Mar. 15, 1999, now abandoned.

(51) Int. Cl.
    *G06F 7/00* (2006.01)
(52) U.S. Cl. .................... 707/10; 707/101; 707/102
(58) Field of Classification Search ................ 707/10, 707/101, 102
    See application file for complete search history.

(56) References Cited

U.S. PATENT DOCUMENTS

| | | |
|---|---|---|
| 5,787,247 A | 7/1998 | Norin et al. |
| 6,065,017 A | 5/2000 | Barker |
| 6,157,932 A | 12/2000 | Klein et al. |
| 6,199,110 B1 | 3/2001 | Rizvi et al. |
| 6,223,219 B1 | 4/2001 | Uniacke et al. |
| 6,275,857 B1 | 8/2001 | McCartney |
| 6,363,391 B1 | 3/2002 | Rosensteel |
| 6,643,654 B1 | 11/2003 | Patel et al. |

OTHER PUBLICATIONS

Lomet, D.B. Persistent Applications Using Generalized Redo Recovery. IEEE ICDE Conference, Orlando, FL (Feb. 1998) 154-163.*

Barga, R., Lomet, D., Baby, T., and Agrawal, S. Persistent Client-Server Database Sessions. EDBT Conference, Lake Constance, Germany (Mar. 2000) 462-476.*

(Continued)

*Primary Examiner*—David Y Jung
(74) *Attorney, Agent, or Firm*—Lee & Hayes, PLLC

(57) ABSTRACT

A client-server database system enables persistent client-server database sessions, without modification to a client-side application, a database system, or native client-side database drivers. The client is implemented with a driver manager to facilitate communication between the native database drivers and the database application. The driver manager wraps the native drivers, intercepting queries passed from the database application to the database drivers. The driver manager modifies the queries to form modified queries that direct the database server to render result sets produced from processing the queries persistent at the database server. Upon recovery following a server crash, the driver manager directs the drivers to reestablish a connection with the database server. The driver manager then finds the persistent result set table and, using logged data, returns to the same operation on the result set table just prior to the crash. The driver manager then reassociates the application context to the new database session without the database application being aware that a failure occurred. The recovery is thus transparent to the client-side application.

10 Claims, 7 Drawing Sheets

OTHER PUBLICATIONS

Resource management for continuous multimedia database applications Jiandong Huang; Ding-Zhu Du; Real-Time Systems Symposium, 1994., Proceedings. Dec. 7-9, 1994 pp. 46-54.*

Sharing Session Keys in Encrypted Databases Yi Tang; e-Business Engineering, 2006. ICEBE '06. IEEE International Conference on Oct. 2006 pp. 47-54.*

Performance engineering of a Java-based e-commerce system Liu, T.-K.; Santhosh Kumaran; Chung, J.-Y.; e-Technology, e-Commerce and e-Service, 2004. EEE '04. 2004 IEEE International Conference on Mar. 28-31, 2004 pp. 33-37.*

"Enhancing throughput over wireless LANs using channel state dependent packet scheduling", Bhagwat et al., INFOCOM '96, Fifteenth Annual Joint Conference of the IEEE Computer Societies, Networking of the Next Generation, vol. 3, pp. 1133-1140.

Real-Time extension for Windows NT/CE used for control systems, Kawakami et al., SICE 2000, Proceedings, International Session Papers, pp. 319-324.

"Next generation networks architecture for multimedia application", Drempetic et al., Video/Image processing and multimedia communications, 2003, 4th EURASIP Conference focused on, vol. 2, pp. 563-568.

* cited by examiner

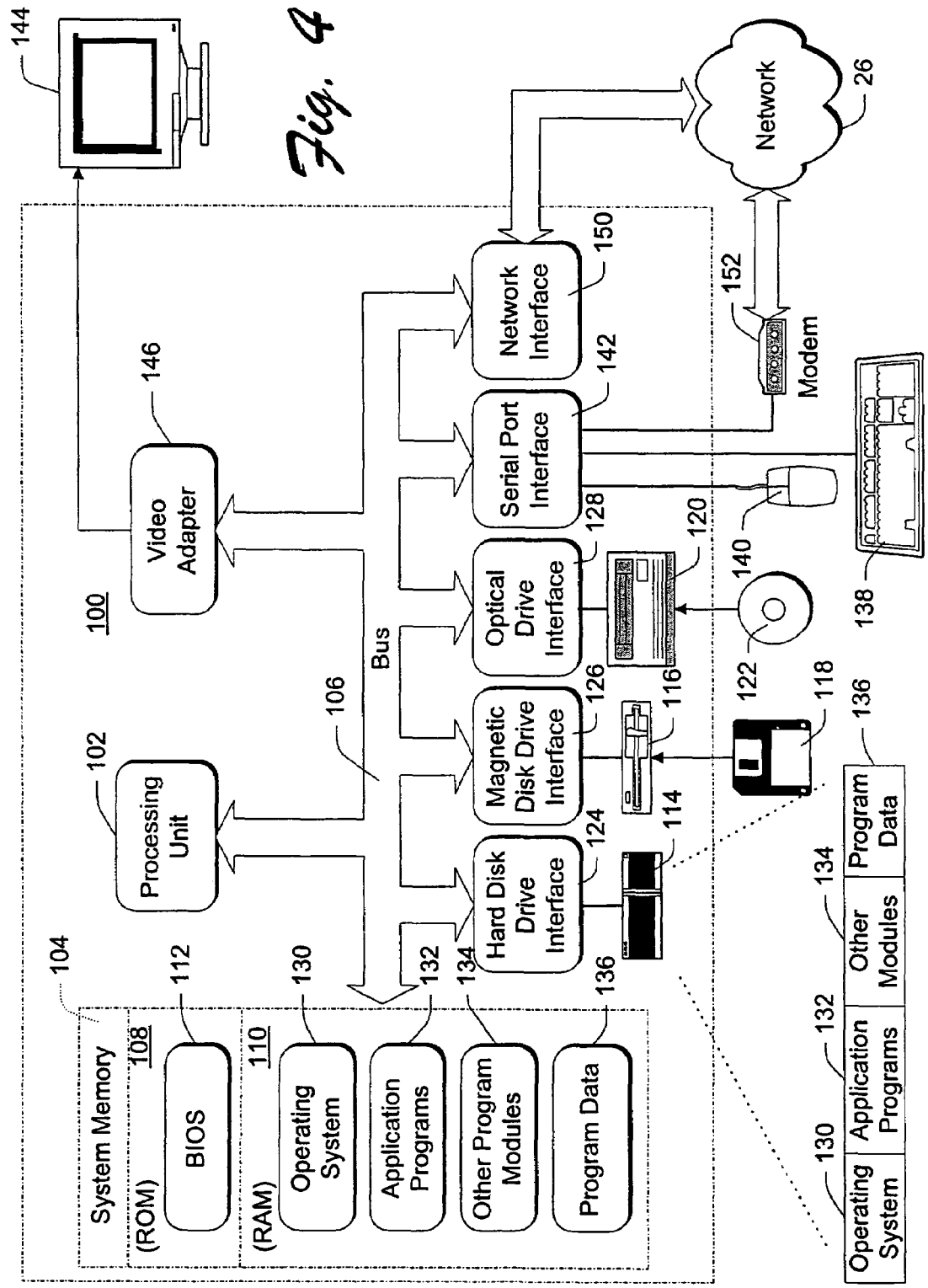

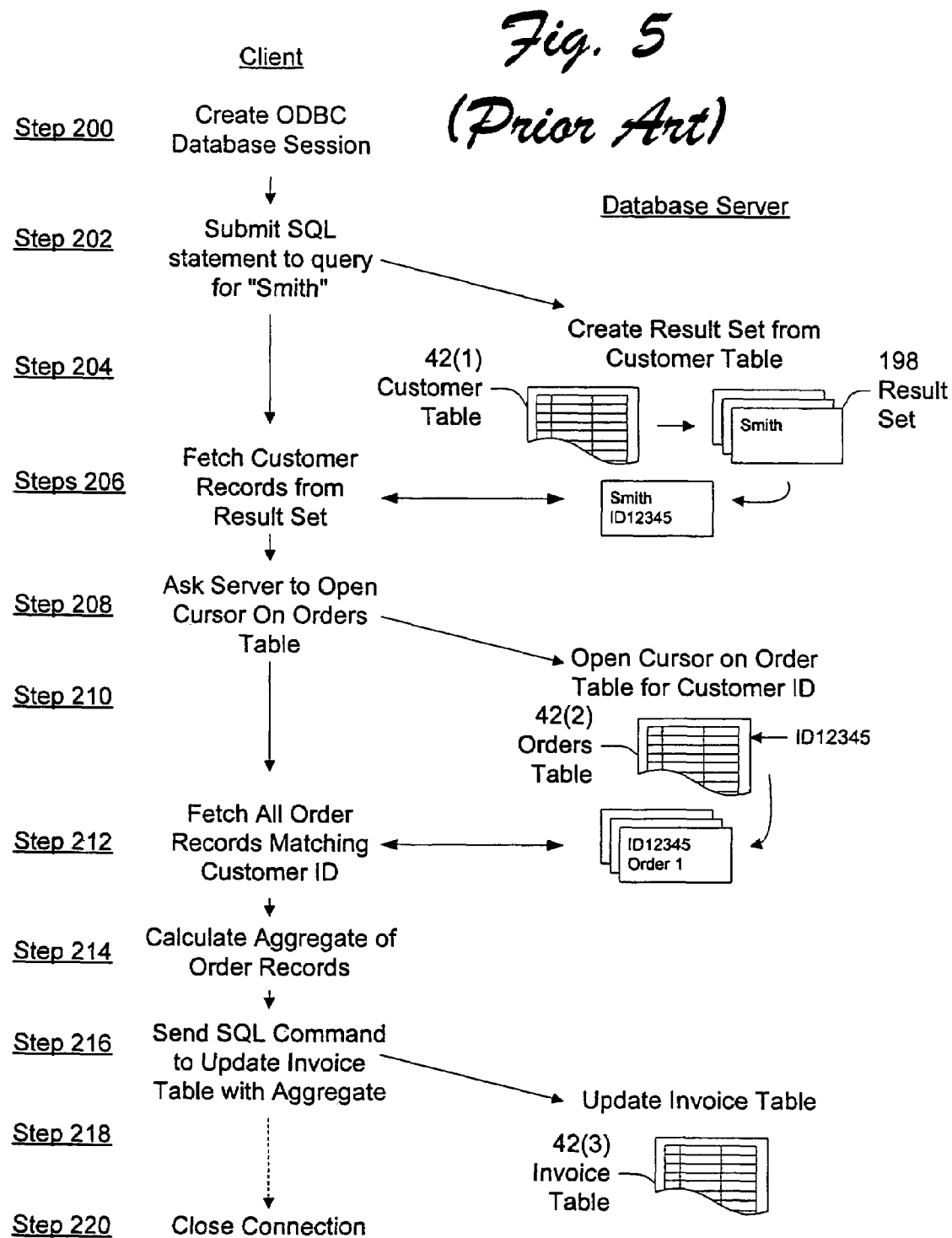

PERSISTENT CLIENT-SERVER DATABASE SESSIONS

RELATED APPLICATION(S)

This is a divisional of U.S. patent application Ser. No. 10/128,053, entitled "Persistent Client-Server Database Sessions", which was filed Apr. 22, 2002 as a divisional of U.S. patent application Ser. No. 09/268,240, which was filed Mar. 15, 1999, now abandoned.

TECHNICAL FIELD

This invention relates to client-server computer systems. More particularly, this invention relates to systems and methods that enable database applications running on the client to persist across server crashes.

BACKGROUND

Computer systems occasionally crash. A "system crash" is an event in which the computer quits operating the way it is supposed to operate. Common causes of system crashes include power outage, application operating error, and computer goblins (i.e., unknown and often unexplained malfunctions that tend to plague even the best-devised systems and applications). System crashes are unpredictable, and hence, essentially impossible to anticipate and prevent.

A system crash is at the very least annoying, and may result in serious or irreparable damage. For standalone computers or client workstations, a local system crash typically results in loss of work product since the last save interval. The user is inconvenienced by having to reboot the computer and redo the lost work. For servers and larger computer systems, a system crash can have a devastating impact on many users, including both company employees as well as its customers.

Being unable to prevent system crashes, computer system designers attempt to limit the effect of system crashes. The field of study concerning how computers recover from system crashes is known as "recovery." Recovery from system crashes has been the subject of much research and development.

Current database systems support fault-tolerance and high availability by recovering quickly from system failures. In general, the goal of redo recovery is to return the computer system after a crash to a previous and presumed correct state in which the computer system was operating immediately prior to the crash. Then, transactions whose continuations are impossible can be aborted.

Much of the recovery research focuses on database recovery for database computer systems, such as network database servers or mainframe database systems. Imagine the problems caused when a large database system having many clients crashes in the midst of many simultaneous operations involving the retrieval, update, and storage of data records. Database system designers attempt to design database recovery techniques that minimize the amount of data lost in a system crash, minimize the amount of work needed following the crash to recover to the pre-crash operating state, and minimize the performance impact of recovery on the database system during normal operation.

While database recovery techniques are helpful for recovering data, the techniques offer no help in recovering applications that are interacting with the database at the time of failure. Currently, such applications either fail, resulting in an application outage, or are forced to cope with database failures assuming they survive the database crash. The former compromises application availability and can increase operational complexity. The later either severely restricts application flexibility or increases its complexity.

When an application fails because of a database system crash, organizations responsible for the application need to quickly bring the application back on line. In the enterprise-computing world, time is quite literally money. Database recovery ensures that the database state is consistent. However, an application retaining state across database transactions can have consistency requirements that are not captured at the database transaction boundary. Furthermore, parts of the application state may be lost during a crash. Restoring and continuing application execution is all too frequently a very complex and time-consuming operational problem.

In some system configurations, an application can survive a database system crash. For example, when the application executes on a client machine while the database is on a separate server. This permits the application to include logic to deal with database crashes and hence avoid an application outage. However, handling errors or exceptions is a very difficult part of getting applications right. Dealing with database system failures at the application level is tedious and error-prone, even when the application itself stays alive.

There has been some work in this area. One technique exploits logging and recovery techniques to enable applications to be recoverable. See, e.g., Lomet, D. Application recovery using generalized redo recovery. *Int'l. Conference on Data Engineering*, Orlando, Fla. (February, 1998); and Lomet, D. and Tuttle, M. Redo recovery from system crashes. *VLDB Conference*, Zurich, Switzerland (September 1995) 457-468. The focus of this work has been to minimize the impact of providing recovery on the normal operation of the system. In practice, this means minimizing the amount of logging and application checkpointing required. Sometimes, it means making the application an object that can be managed by the database recovery manager.

Other prior work on application fault-tolerance in distributed systems is based on some form of application "installation points" and/or "message logging". The prior work can be categorized into the following three approaches, all of which incur high normal operation and/or recovery costs: (1) fault-tolerant process pairs, (2) distributed state tracking, and (3) persistent queues.

Another client-server system directed to application recovery is described in U.S. patent application Ser. No. 09/033,511, entitled "Client-Server Computer System With Application Recovery of Server Applications and Client Applications", which was filed Mar. 2, 1998 in the names of David B. Lomet (an inventor in this invention) and Gerhard Weikum. This application is assigned to Microsoft Corporation.

Despite these efforts, there remains a need to improve application recovery techniques in client-server database systems. Particularly, there is a need to provide application recovery at modest system implementation cost that avoids modification to the application itself.

SUMMARY

This invention concerns a client-server database system that enables persistent client-server database sessions, without modification to a client-side application, database system, or native client-server access mechanisms (called drivers). The client-server database system preserves sessions across a server crash without the client-side application being aware of the outage, thereby making recovery transparent to the application.

In one implementation, the client-server database system has a client computer and a database server computer. The database server computer runs a database server program that handles client queries for data in one or more database tables stored in a stable storage.

The client has a database application to formulate the client queries for the data kept in the tables. One or more client-side database drivers facilitate communication between the database application and the database server program.

The client is further implemented with a driver manager to facilitate communication between the database drivers and the database application. The driver manager wraps the native drivers, intercepting queries passed from the database application to the database drivers and responses returned from the drivers to the application. The driver manager modifies the queries to form modified queries that direct the database server to render result sets produced from processing the queries persistent at the database server.

If the query will result in creation of a result set, for example, the driver manager alters the query to direct the database server to create a result set table in the stable storage and fill the table with the result set obtained from processing the query. In this manner, the result set will persist across a server crash. The driver manager continues to convert statements from the database application for operation on the result set table and reconvert responses from the database server prior to returning them to the database application. The driver manager further tracks application statements and a current result set table location in a log maintained at the client. Thus, the database application is unaware of the actions being taken to make the session persistent.

Upon recovery following a server crash, the driver manager directs the drivers to reestablish a connection with the database server. The driver manager then finds the persistent result set table and using data from the log, returns to the same operation on the result set table just prior to the crash. The driver manager reassociates the application context to the new database session without the database application even knowing that a failure occurred.

BRIEF DESCRIPTION OF THE DRAWINGS

FIG. 4 is a block diagram of a computer used as the client and/or server in the client-server system.

FIG. 5 is a prior art process of a conventional client-server database session that is not persistent across a server crash.

DETAILED DESCRIPTION

This invention concerns client-server database systems and techniques for making client-server database sessions persistent across database server crashes. In general, the system is responsible for application persistence across server failures. The system acts to ensure that the application is recoverable and able to continue execution after the crash, without the application taking any measures on its own to ensure its survival. This characteristic is referred to as "transparent" application recoverability.

The transparent application recovery scheme is described in the context of a "middleware" software architecture in which a client-based software component is layered between a native database driver layer (e.g., ODBC layer) and a database application layer (e.g., SQL layer). The middleware infrastructure can be readily installed on client machines without introducing a substantial recovery manager or extensively modifying an existing database system's recovery manager. Furthermore, the middleware infrastructure requires no modification to the client-side drivers and application. It is noted, however, that the invention may be implemented in other architectures, such as at other client layers, or partly at the client and partly at the server.

System

Figure 1:
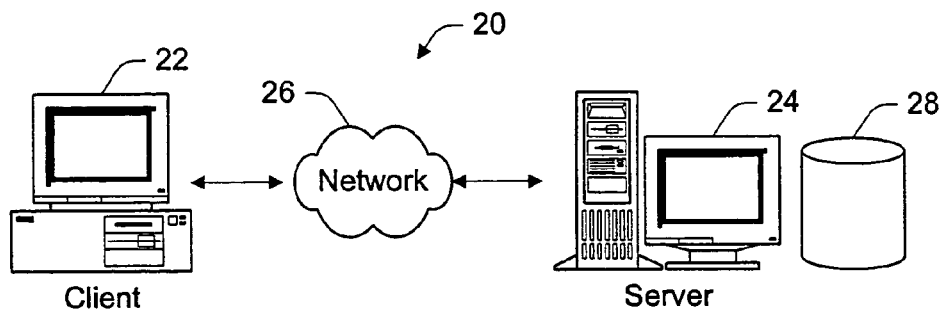
FIG. 1 shows a client-server system that enables client-server database sessions to persist across a server crash.

FIG. 1 shows an exemplary client-server system 20 having a client computer 22 connected to a server computer 24 via a network 26 (e.g., LAN, WAN, Internet, etc.). The client system 22 is general-purpose computer that runs one or more applications. It is illustrated as a desktop personal, but can be implemented in other forms, such as a laptop, a workstation, and so forth.

The server 24 is a general-purpose computer that is configured as a database server to serve data from a persistent database 28. The server is illustrated as a server-enabled personal computer, such as a computer configured to run the Windows NT operating system from Microsoft Corporation. However, the server 24 may further be implemented in other forms, such as a UNIX-based server, a minicomputer, or a mainframe. The server can service more than one clients, although only one client is shown for discussion purposes.

Software Architecture

Figure 2:
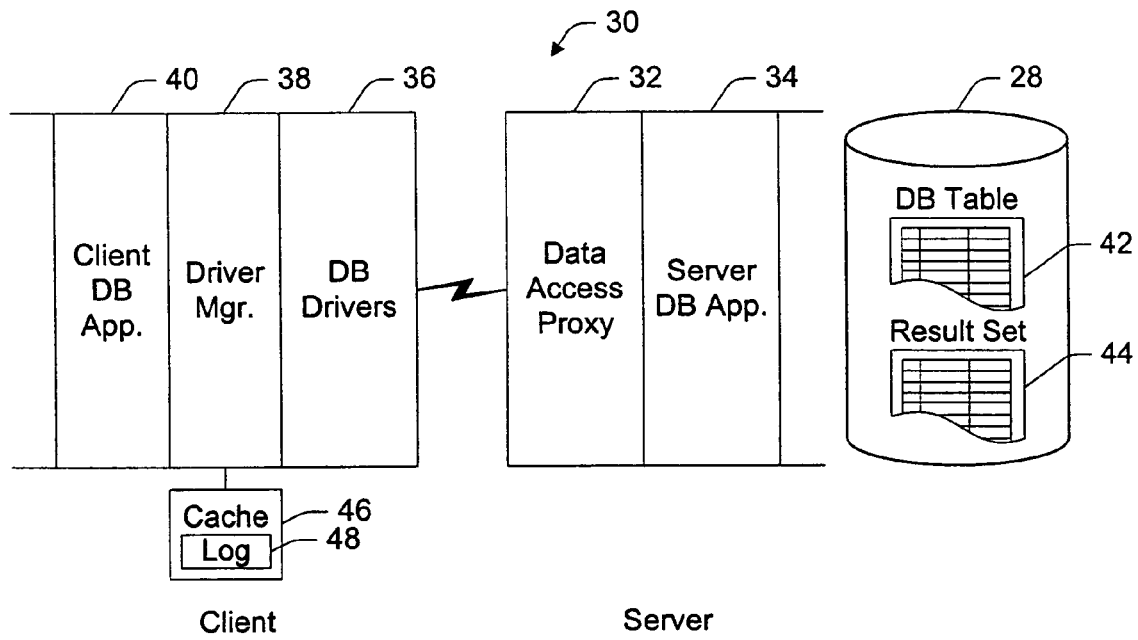
FIG. 2 shows a software architecture of the client-server system.

FIG. 2 shows an exemplary software architecture 30 for the client-server system 20 of FIG. 1. The server-side software includes a data access proxy component 32 that receives requests from the client 22 and passes them to the appropriate server application. The server-side software also includes a database application 34 that manages data stored on database 28 and handles client requests for that data. In a detailed example described below, the database application 34 is implemented as a SQL (structured query language) server application available from Microsoft Corporation, but other database applications may be used.

The client-side software includes one or more database drivers 36 that facilitate data communication with the database server. The database drivers 36 are typically implemented as a client stub sold as part of the database system. The drivers support a set of APIs (application program interfaces).

The client-side software further includes a driver manager 38 that wraps the driver stub 36, and a client database application 40 (e.g., SQL client). The client application 40 communicates with the database server 24 by calling the APIs supported by the database drivers 36. With this architecture, the client database application 40 sends query requests via the database driver 36 to the database server 24 to locate data records maintained in one or more database tables 42, which are stored in database 28.

The driver manager 38 manages communications between the application 40 and database drivers 36. The driver manager 38 selects a driver for a particular database when the application first connects to the database and then passes all function calls coming from the application to the driver. The driver manager may also handle some function calls directly, and detect and handle some types of errors.

The client-server software architecture 30 provides persistent database sessions for the client application 40 during its interaction with the database server 24. The sessions can survive a database server crash without the client application 40 being aware of the outage, except for possible timing considerations.

The driver manager 38 wraps the database driver layer 36 and intercepts all communication between the client application 40 and the database driver 36. By wrapping the driver APIs, the intermediate manager layer 38 is able to alter commands from the client application to direct the server database to make volatile session state persistent. For example, when the client application sends a query to locate records in a database table 42, the manager 38 rewrites the query statement before passing the statement on to the native driver 36. The rewritten statement asks the database server to create a persistent database table into which the query result set can be captured. Thus, the result set from the query is stored in a result set table 44 that can survive a system failure.

The client 22 is also equipped with a cache 46 that stores a log 48. The driver manager 38 intercepts and logs all requests going from the client application 40 to the database server 24 in the log 48. The manager 38 also intercepts responses from the database server 24 and variously caches certain responses in cache 46, filters other responses, reshapes result sets returned in response to queries, and synchronizes with state materialized on the database server.

Accordingly, in one implementation, the manager 38 contains all of the necessary code to enable persistent database sessions to client application 40, without the application 40 needing to take measures for its recoverability. Further, there are no modifications to either the database system or native drivers 36. In this manner, the architecture 30 integrates database server recovery and transparent session recovery. The result is persistent client-server database sessions that survive a server crash without the client application being aware of the outage (except for possible timing considerations) and without requiring changes to the database system, native driver, or any special application programming.

General Operation

Figure 3:
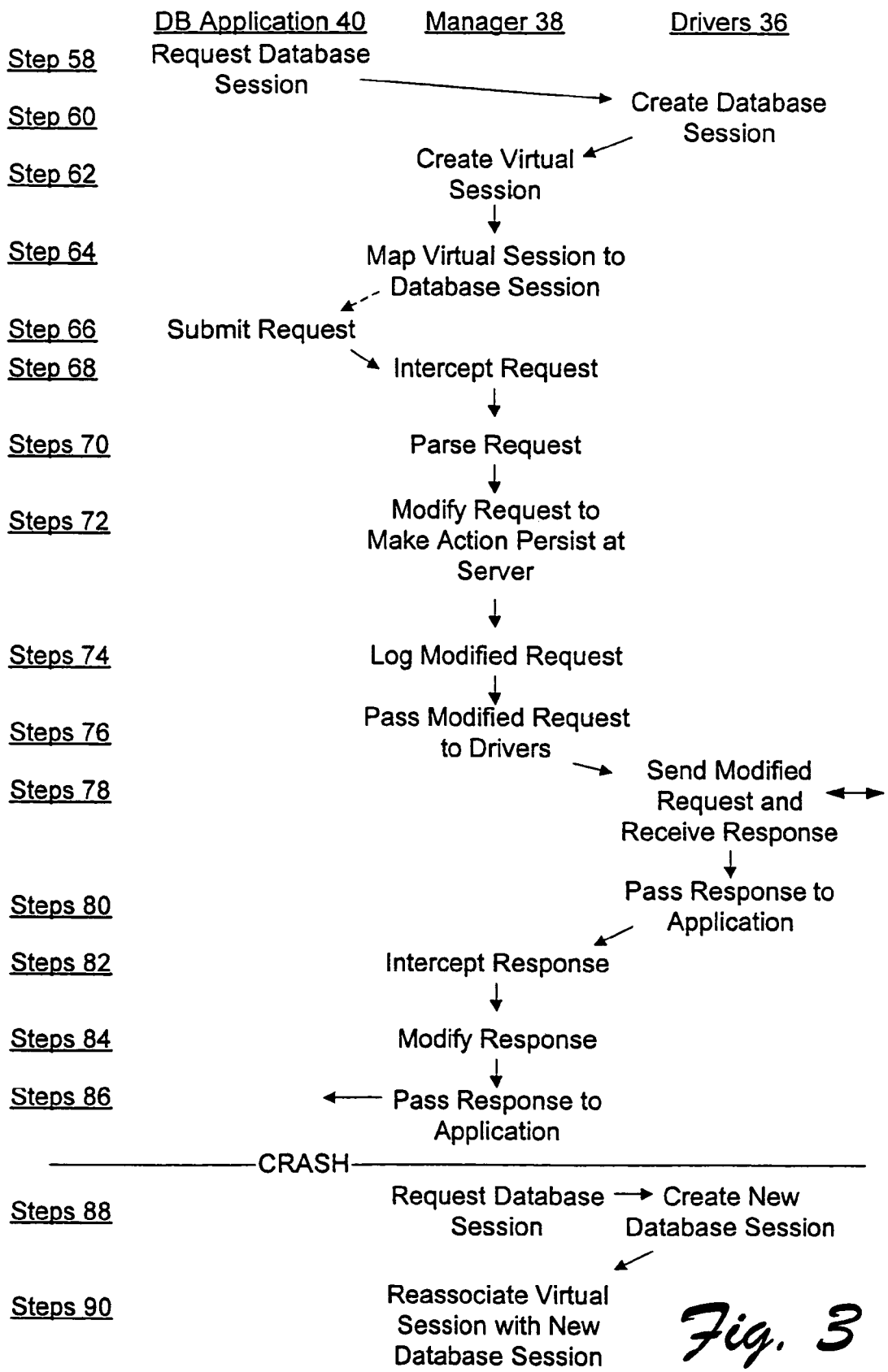
FIG. 3 is a process performed by a client in the client-server system.

FIG. 3 shows a process performed by the client during an exemplary database interaction. The process is performed in software, with exemplary modules of the client database application 40, the driver manager 38, and the database drivers 36 performing selected operations. At step 58, the client application 40 issues a request to initiate a database session. The driver manager 38 passes this request on to the native driver 60. At step 60, the driver 36 initiates a client-server database session on behalf of the database application 40 by establishing a connection with the database system. In the context of ODBC (Open Data Base Connectivity), the driver 36 establishes an ODBC session with which the client database application 40 can interact. These ODBC sessions do not normally survive a server crash.

To provide persistent database sessions, the intermediate driver manager layer 38 insulates the client application 40 from these underlying database sessions formed by the drivers 36. To do this, the driver manager layer 38 creates a virtual database session (step 62 in FIG. 3) and maps the virtual session onto a normal database session supported by the drivers 36 (step 64). In one implementation, the ODBC connection is identified by a connection handle and the driver manager 38 maps the connection handle to a virtual connection handle. The driver manager then returns the virtual connection handle to the application. Should a crash occur, the driver manager establishes a new connection with the database server and remaps the virtual connection handle to the handle for the new connection. This At step 66 in FIG. 3, the client database application 40 submits a request for processing at the database server 24. The driver manager 38 intercepts the application request (step 68). It performs a one-pass parse to determine the request type (step 70 in FIG. 3).

Depending upon the request type, the driver manager 38 may modify the request to direct the database server to preserve the request and/or results produced in response to the request in the persistent database 28 at the server 24 (step 72). For example, if the request causes the server to search a database table 42 and create a result set, modification of the request may involve telling the server to create a persistent table 44 in which the result set can be stored. In this way, the architecture allows the volatile state to be materialized as persistent tables at the server. A detailed example involving creation of a persistent result set table in an ODBC/SQL environment is given below under the main heading "Exemplary ODBC/SQL Implementation" and the subheading "Exemplary Session with Driver Wrapper Layer 38".

The driver manager 38 may optionally log the modified request in the log 48 in client cache 46 (step 74). This is particularly helpful when interacting with a persistent result set table 44. The driver manager 38 can track location in the result set table 44 by logging such information in the log 48. Such location information can then be made available during recovery to return the pre-crash location in the table.

The driver manager 38 passes the modified request to the drivers 36 (step 76 in FIG. 3). The drivers 36 send the request to the database access proxy 32 and server application 34 and receives responses returned from them (step 78). The drivers 36 pass responses onto the application (step 80).

The driver manager 38 intercepts the responses before they get to the application (step 82). The driver manager 38 may modify the responses so that the application is unaware of the changes made to the original request (step 84). For instance, the application may be unaware that it is interacting with a persistent result set table 44 stored in stable database 28 at the server. The driver manager also checks for errors in an effort to detect failures. The driver manager 38 then passes the response onto the application (step 86).

When a crash is detected, the driver manager 38 requests a new session and the drivers 36 create a post-crash database session with an appropriate volatile state (step 88). They do this by establishing a private database connection and pinging the server for recovery. Once the server is found, the driver manager 38 reconnects the virtual session with the new post-crash session (step 90). This involves reconnecting the session to any persistent tables that were established prior to the crash. After the client application has successfully terminated, the manager 38 cleans up all persistent structures on the database server that were created to store database session state, dropping all tables and stored procedures.

The recovery is transparent to the application 40. When the application interrogates its virtual connection, it only sees the activity on the connection to which its virtual connection is mapped, not the activity on any private connection used by the driver manager layer 38. The mapped connection activity mimics the application's use of a normal ODBC connection.

Exemplary Computer

FIG. 4 shows an exemplary implementation of the client computer 22 from FIG. 1. The computer is a general-purpose computer device in the form of a conventional desktop personal computer 100.

Computer 100 includes a processing unit 102, a system memory 104, and a bus 106 that couples various system components including the system memory 104 to the processing unit 102. The bus 106 represents one or more of any of several types of bus structures, including a memory bus or memory controller, a peripheral bus, an accelerated graphics port, and a processor or local bus using any of a variety of bus architectures. The system memory 104 includes read only memory (ROM) 108 and random access memory (RAM) 110. A basic input/output system 112 (BIOS) is stored in ROM 108.

Computer 100 also has one or more of the following drives: a hard disk drive 114 for reading from and writing to a hard disk, a magnetic disk drive 116 for reading from or writing to a removable magnetic disk 118, and an optical disk drive 120 for reading from or writing to a removable optical disk 122 such as a CD ROM or other optical media. The hard disk drive 114, magnetic disk drive 116, and optical disk drive 120 are connected to the bus 106 by a hard disk drive interface 124, a magnetic disk drive interface 126, and an optical drive interface 128, respectively. The drives and their associated computer-readable media provide nonvolatile storage of computer readable instructions, data structures, program modules and other data for the personal computer. Although a hard disk, a removable magnetic disk and a removable optical disk are described, other types of computer readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 130, one or more application programs 132, other program modules 134, and program data 136. As an example, the database driver 36, driver manager 38 and database application 40 are included as the programs 132 and program modules 134.

A user may enter commands and information into the personal computer 100 through input devices such as keyboard 138 and pointing device 140. Other input devices (not shown) may include a microphone, joystick, game pad, satellite dish, scanner, or the like. These and other input devices are often connected to the processing unit 102 through a serial port interface 142 that is coupled to the bus 106, but may be connected by other interfaces, such as a parallel port, game port, or a universal serial bus (USB).

A monitor 144 or other type of display device is connected to the bus 106 via an interface, such as a video adapter 146. In addition to the monitor, personal computers typically include other peripheral output devices (not shown) such as speakers and printers.

The server computer 100 is connected to the network 26 through a network interface or adapter 150, a modem 152, or other means for establishing communications over the network. The modem 152, which may be internal or external, is connected to the bus 106 via the serial port interface 142.

Exemplary ODBC/SQL Implementation

A specific implementation of the client-server system 20 will now be described with reference to the software architecture shown in FIG. 2. In this implementation, the server-side database application 34 is the SQL server from Microsoft Corporation. The client-side application 40 supports SQL-based communications. Client-side database driver 36 is embodied as an ODBC-compliant driver. ODBC (Open Data Base Connectivity) is a standard application programming interface (API) by which the client application 40 accesses data in the database 28. The detailed implementation is described to examine the differences between a conventional ODBC-based database session and a persistent database session enabled by the client-server architecture 30 of FIG. 2, and namely by the driver manager wrapper layer 38 installed on the client.

ODBC enables any application to access any database that supports this standard by using a standard collection of call points. Included in the standard interface are the following:

A function call library: ODBC function calls provide for connecting to and disconnecting from a database, executing SQL statements, and passing results back to the client application. There are over 50 functions in ODBC Version 3.5 function call library. To query a database, a client application includes the appropriate SQL statement as an argument to an ODBC function call.

Standard SQL subset: The ODBC standard only supports a subset of the SQL standard language. However, since SQL statements can be passed through the interface, proprietary SQL can be executed via ODBC, at the risk of lost application portability. As long as the application uses the ODBC-specified standard SQL syntax, applications work with any ODBC database engine on the back end.

Standard SQL data types and result formats: The ODBC driver converts data types as necessary to present the application with a standard set of types regardless of the specific server. Result formats are also standard, regardless of how they are organized in messages or produced as a result of database queries.

Standard protocols for interactions with a database system: This involves the sequence of interactions required to establish an ODBC client session and to establish "connections" to ODBC compliant database systems. Each database system supports an SQL session for the ODBC client, as defined by the SQL standard.

Standard error codes. Not only are input and output parameters to the ODBC driver part of the standard, but the standard prescribes a complete set of return codes that are required as well. Thus, the application program logic can be the same regardless of what database engine is being used.

Vendors support ODBC by providing drivers that are specifically designed for their particular database system. The ODBC driver's application interface adheres to the ODBC standard. All ODBC drivers support the same call points, regardless of what database engine is on the back end.

The ODBC driver interaction with the database system is customized to the specific database engine. This interaction requires use of proprietary communication protocols, SQL language message formats, and result set representations. Using ODBC, applications need not be customized to or even aware of the proprietary aspects of accessing the data they are using. The driver makes any necessary translations in sending SQL statements to the database system and presents the results back to the application in a standard way, including standard return codes.

According to aspects of this invention, the driver manager 38 is configured to intercept application requests going to the database and responses returned from the server. Like a conventional driver manager, the driver manager 38 is designed to wrap call points of the ODBC drivers 36. But, unlike a conventional driver manager, it creates a surrogate for each function in the ODBC API that intercepts the client application ODBC request on its way to the ODBC driver. Actions that the driver manager 38 takes to analyze the application request and provide for the persistence of volatile session state are performed in the surrogate, prior to passing the application request on to the native driver 36. This approach to providing server database sessions that survive server crashes is completely transparent to other system components. It requires no changes to native ODBC drivers 36, client application programs 40, or SQL database systems 34.

To illustrate the difference between a conventional ODBC session and one that is enhanced by the driver manager, the following discussion presents to different scenarios. The first scenario is a conventional ODBC session without the driver wrapper layer 38. The second scenario is a persistent ODBC session achieved by inclusion of the driver wrapper layer 38.

Exemplary Session without Driver Wrapper Layer 38

A conventional ODBC database session for a SQL server is described with reference to FIG. 5, and with additional reference to selected architectural components in FIG. 2. It is noted that the conventional architecture used to achieve the ODBC session is similar to that shown in FIG. 2, except the driver manager 38 is not present. The conventional architecture may include a software layer between the application and drivers, but this layer is "vanilla" in that it merely facilitates communications between the application and drivers without attempting to modify the requests or track them or perform other functionality described herein that render the sessions persistent.

Consider a database session involving a data analysis query, similar to those in the TPC-D benchmark. This query involves three database tables: a master customer table 42(1), a detail orders table 42(2), and an invoice table 42(3). The task is to extract appropriate records for a customer with the last name "Smith" from the customer table, find that customer's current orders from the detail orders table, and aggregate the order totals into an invoice table. This client application might be coded as follows.

At step 200 in FIG. 5, the client-side ODBC driver 36 creates an ODBC database session by opening a connection to a named database server, following a standard protocol to log on to the server, and issuing a series of ODBC function calls to set application specific attributes on the database connection. Next, at step 202, the ODBC driver 36 submits an ODBC function containing a SQL statement to create a result set 198 from the master customer table 42(1) consisting of records for customers with a last name of "Smith". In response, the database server locates all customer records indexed for "Smith" and generates a result set 198 (step 204).

At step 206 in FIG. 5, the client application issues fetch commands to retrieve records from result set, until the target customer record is found. The database server serves customer records from the result set until the customer record is located. Then, the client application submits an ODBC function containing a SQL statement to open a cursor on the orders table 42(2) for orders matching an identifier (ID) associated with the customer (step 208). The server database responds by opening a cursor on the orders table 42(2) (step 210).

The client application issues fetch commands to retrieve all matching order records in the orders table 42(2) that match this customer ID (step 212). The client application calculates an aggregate of the order records associated with the customer ID (step 214). It then submits an ODBC function containing a SQL statement to update the invoice table 42(3) with the calculated aggregate (step 216). In response, the database server updates the invoice table 42(3)(step 218). Following the update, the ODBC driver 36 issues an ODBC function call to close the connection to the database, terminating the ODBC session (step 220).

Unfortunately, the conventional ODBC standard leaves undefined what behavior the client application can expect should the database server to which it has a connection fail. The effects of a server failure might involve:

Detecting Server Failure: ODBC functions may simply "hang" when the server fails. The user does not know whether the server is busy, the connection slow, or if a database failure has occurred. Once a database failure is verified the application must be terminated manually.

Application Availability: Once server failure has been detected and the application terminated, the application must be restarted, a new ODBC session established, and a new connection to the database opened. Partial application execution can leave the state confused, requiring long outages in order to reconstruct a consistent application state. This too can require manual intervention.

Loss of Transient State. If a failure occurs after the application has created volatile server state, for example result sets from SQL statements or temporary tables holding results or user input, this state is lost. Moreover, it may be impossible to reliably re-create this state because subsequent database updates have changed the subset of the data upon which the lost state depends.

Exemplary Session with Driver Wrapper Layer 38

Now, consider the client-server architecture 30 of FIG. 2, which includes the driver manager 38. In the ODBC/SQL implementation, including the driver manager 38 intermediate of the client application 40 and ODBC drivers 36 provides persistent database sessions for the client application 40 during its interaction with the database server.

An initial step towards providing ODBC persistent database sessions is to decompose session state into separate elements, each of which can be managed as a distinct data object. These elements of session state have different lifetimes and recovery requirements. Session state elements include:

Session Context: This element includes a set of client specifiable attributes of the client's ODBC session, including the connection request, user login information, and default database settings. Database server specific information is also included, e.g., user identification, current database, user temporary objects, such as temporary tables and stored procedures, and unacknowledged messages sent by the server to the client.

Results of SQL Queries: SQL statements return one or more of following:
A result set for a SELECT statement;
A global cursor which can be referenced outside the SQL statement;
Return codes, which are integer values; and
Output parameters, which can be either data or a cursor variable.

Database Procedures: Procedures can be stored at the server, consisting of one or more SQL statements that have been precompiled.

SQL Command Batch: This element is a group of two or more SQL statements, or a single SQL statement that has the same effect as a group of two or more SQL statements.

While there are subtleties to each element of an applications ODBC state, result sets are particularly challenging. Accordingly, an aspect of this invention is to configure the driver manager 38 to render result sets persistent and ensure their seamless delivery to a client application. A SQL statement result is made persistent by being stored as a persistent SQL table 44 in the database 28. Seamless delivery is ensured by re-accessing this table after a failure and reestablishing the place where the pre-crash delivery was interrupted.

Figure 6A:
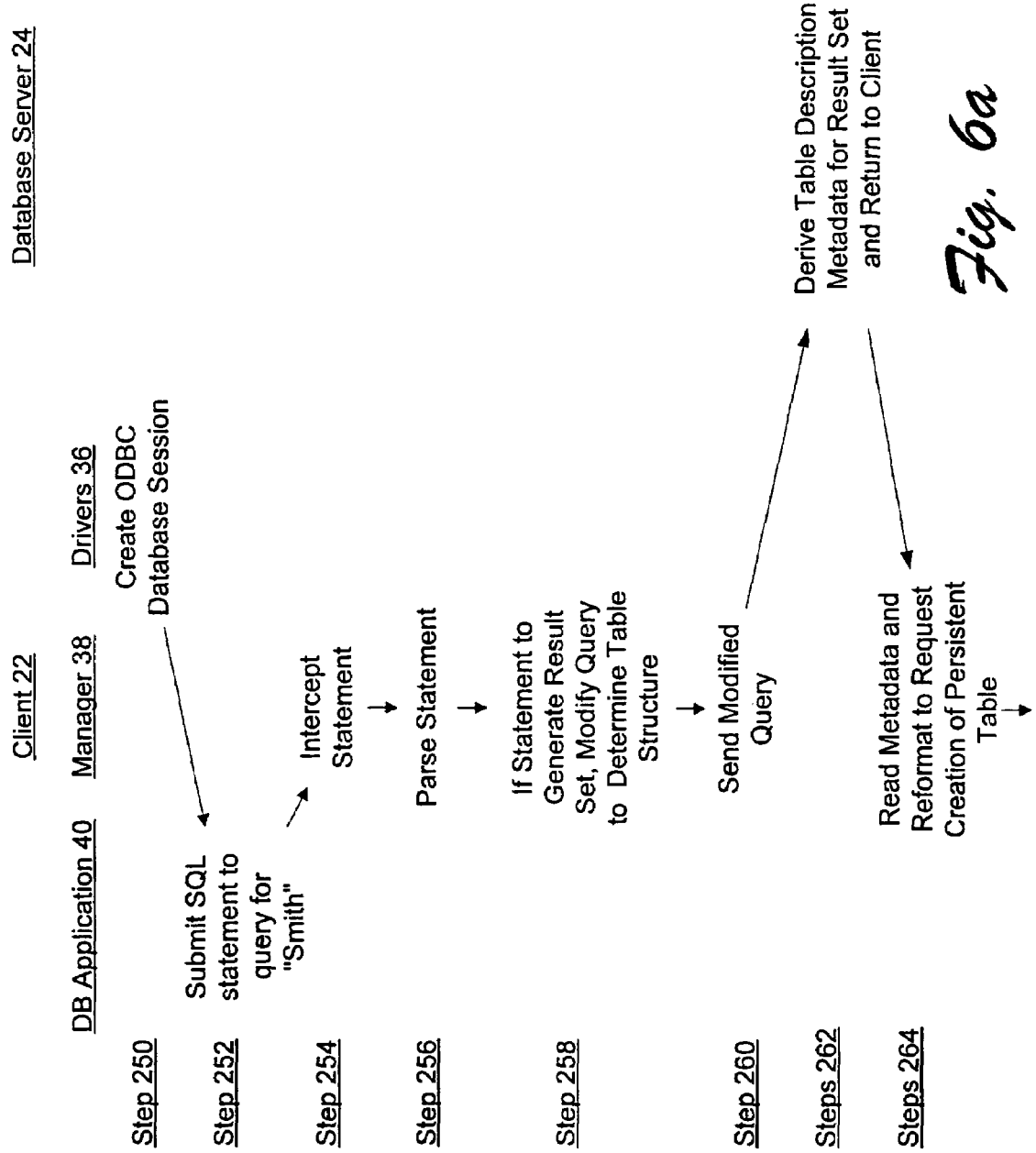
FIGS. 6a and 6b is a process performed by the client and server to render persistent database sessions.
Figure 6B:
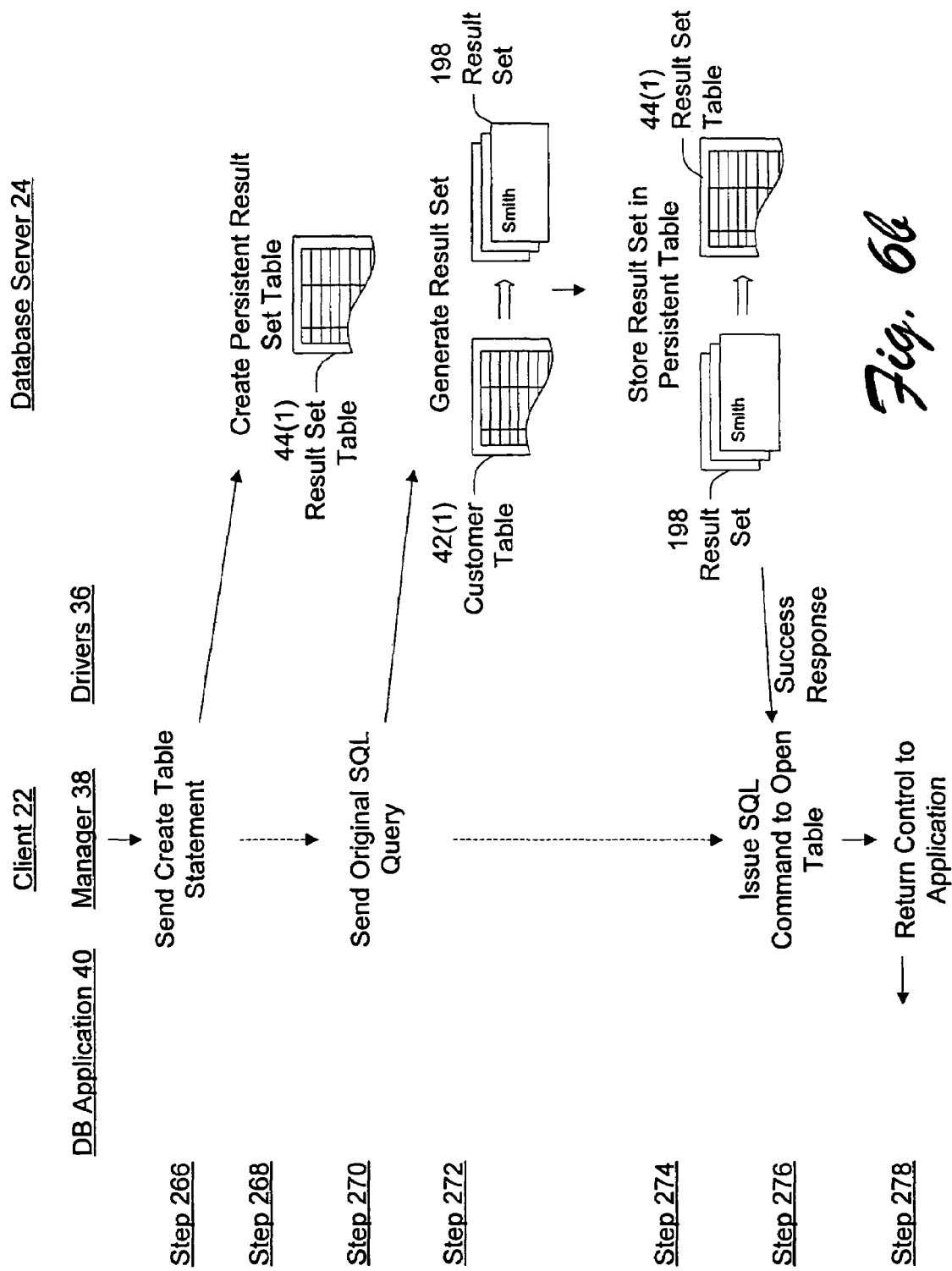

FIGS. 6a and 6b show the process for enabling persistent database sessions involving result sets. The process is described with reference to the architecture of FIG. 2 and in the context of the example described above involving a database session for a data analysis query. As above, the query involves accessing a master customer table 42(1) to extract appropriate records for a customer with the last name "Smith". The process below details this phase of the query and how a result set with the "Smith" customer records are made persistent. The process is performed in software at the client 22 and server 24, with FIGS. 6a and 6b showing exemplary locations of where selected steps are performed, including the client database application 40, the driver manager 38, and the database drivers 36.

At step 250 in FIG. 6a, the client-side ODBC driver 36 creates an ODBC database session by opening a connection to a named database server, following a standard logon protocol of the server, and issuing a series of ODBC function calls to set application specific attributes on the database connection. Next, at step 252 in FIG. 6a, the client application submits a query to search the customer table 42(1) for records of customers with a last name of "Smith".

The driver manager 38 intercepts the application request (step 254 in FIG. 6a). It performs a one-pass parse to determine the request type (step 256 in FIG. 6a). If the application request is a SQL statement that generates a result set (as is the case in this example), the driver manager 38 determines the structure of the result set by modifying the query to acquire the result set "table description metadata" (step 258 in FIG. 6a). The result set includes such items as the names of attributes, their types, and the order in which they appear in each returned tuple. Since the driver manager 38 need only know the result format in order to create a persistent SQL table, the driver manager gathers the metadata. The metadata describes the number of columns in the result set, the data types of those columns, their names, precision, nullability, and so on.

To minimize expensive network traffic between the server and client, the table description metadata is acquired with a single round trip to the server with minimum data transfer and minimum server impact. One way to modify the query is for the driver manager 38 to append the clause "WHERE 0=1" to the original SQL statement, essentially rewriting the statement. At step 260 in FIG. 6a, the driver manager 38 sends the modified query to the server via the native ODBC driver 36. The server determines the table description metadata for the result set and ODBC delivers the result set metadata as a prefix to delivery of the result data (step 262 in FIG. 6a). By appending the clause "WHERE 0=1", it is guaranteed that the query will not be executed and that no result data will actually be returned, thereby minimizing both server load and message size. Only query compilation is performed on the server, and only the metadata is returned in the reply message.

At step 264 in FIG. 6a, once the server returns a response indicating the rewritten SQL statement has successfully executed, the driver manager 38 reads the table description metadata and reformats it into a CREATE TABLE statement. The driver manager 38 sends the CREATE TABLE statement to the database server 24 (step 266 in FIG. 6b). In response, the database server 24 creates an empty persistent table 44(1) in stable database 28 to hold an eventual result set obtained from the "Smith" query (step 268 in FIG. 6b).

At step 270 in FIG. 6b, the driver manager 38 sends a request to the server 24 to execute a procedure containing the original SQL statement submitted by the client database application 40 in step 252. The server 24 executes the query to generate a result set (step 272 in FIG. 6b). In our example, the server executes original SQL statement query on the customer table 42(1) for all records having a customer named "Smith" and generates a result set 198. The result set 198 is then stored in the persistent result set table 44(1) (step 274). Once the server has returned a response indicating the procedure was successfully executed, the result set is stable and will persist across server failures.

What is materialized depends on both the original SQL statement and on how the application requests the results set from the server. With ODBC, the "how" is determined by the statement options specified prior to executing a SELECT. When ODBC default values are used as the options, for example, the database server 24 sends the result set in the most efficient way possible. The server assumes that the application will fetch all the rows from the result set promptly. Therefore, the database server sends all rows from the result set and the client application buffers any rows that are not used immediately but may be needed later. This is referred to as a "default result set".

To materialize a default result set, the driver manager creates the following stored procedure, using ANSI-standard SQL:

CREATE PROCEDURE P (@T string) AS INSERT
<original SQL statement>
INTO T

The advantage of using a stored procedure is that all data is moved locally at the server, not sent first to the client. It involves a single round-trip message from client to server, rather than having data moving across the network. Moreover, the action is itself an atomic SQL statement.

At step 276 in FIG. 6b, the driver manager 38 issues a SQL statement (e.g., SELECT * FROM T) to open the result set table 44(1). The driver manager 38 then returns control, to the database application program 40 for normal processing (step 278).

As the database application program 40 makes requests on the result table 44(1), the driver manager tracks the current location in the persistent result set 44(1) by logging location information in the stable log 48 in client cache 46. Should a failure occur, subsequent database recovery ensures the result set exists after the failure. The driver manager 38 resumes access to the result set at the remembered location of the last access before the database system failure.

Use of Persistent Cursors to Return Results

The above example used default result sets as a way to return results. It is noted that the SQL language permits results to be returned in ways other than by default result sets. An application can control delivery of results at a much finer granularity by exploiting cursors. Two cursor forms are keyset cursors and dynamic cursors.

An application's SQL query may return no rows, a few rows, or millions of rows. Since the user rarely wants to see millions of rows, fetching and buffering millions of rows is usually a waste of time and resources. Server cursors, such as keyset and dynamic cursors, allow an application to fetch results a block of rows at a time from an arbitrarily large result set. The application is permitted to "navigate" through the result set via a server cursor. A server cursor allows the application to fetch any other block of rows, including the next n rows, the previous n rows, or n rows starting at a certain row number. The server fills each block fetch request only as needed. Some server cursors also allow an application to update or delete fetched rows. If the row data changes between the time the SQL cursor definition statement is executed and the time the row is fetched by the application, the updated row data is returned. These features of server cursors present unique challenges for the driver manager.

A keyset cursor captures the set of rows that satisfy a query at the time the cursor is opened and it permits those rows to be accessed and updated. If a keyset cursor is requested, the driver manager 38 materializes only keys of the result set rows in the persistent database table 44. When the application attempts to fetch a row from the result set, the driver manager reads the record key from the result row and SELECTs the record from the database server using this key. If the row data has been changed or the record itself has been deleted, the updated row data is returned. In this manner, the architecture transparently supports keyset cursor, but now the cursor persists across failures.

A dynamic cursor specifies a logical predicate (the WHERE clause) that defines the rows of interest. The set of rows fetched changes dynamically as rows are inserted and deleted. If a dynamic cursor is requested, the driver manager 38 materializes the keys of the result set rows in a persistent database table, exactly as it did for keyset cursors. Now, however, when the next row is fetched, it is not necessarily the row with the next key as an insertion may have occurred. Thus, a fetch causes the driver manager 38 to use the last record key seen by the application and the next record key from the table to SELECT a range of rows from the database server. If records have been inserted into this range, the driver manager fetches them and presents the appropriate row to the application. Again, the architecture transparently supports dynamic cursors, but now the cursors persist across failures.

Server and Session Crash Recovery

Figure 7:
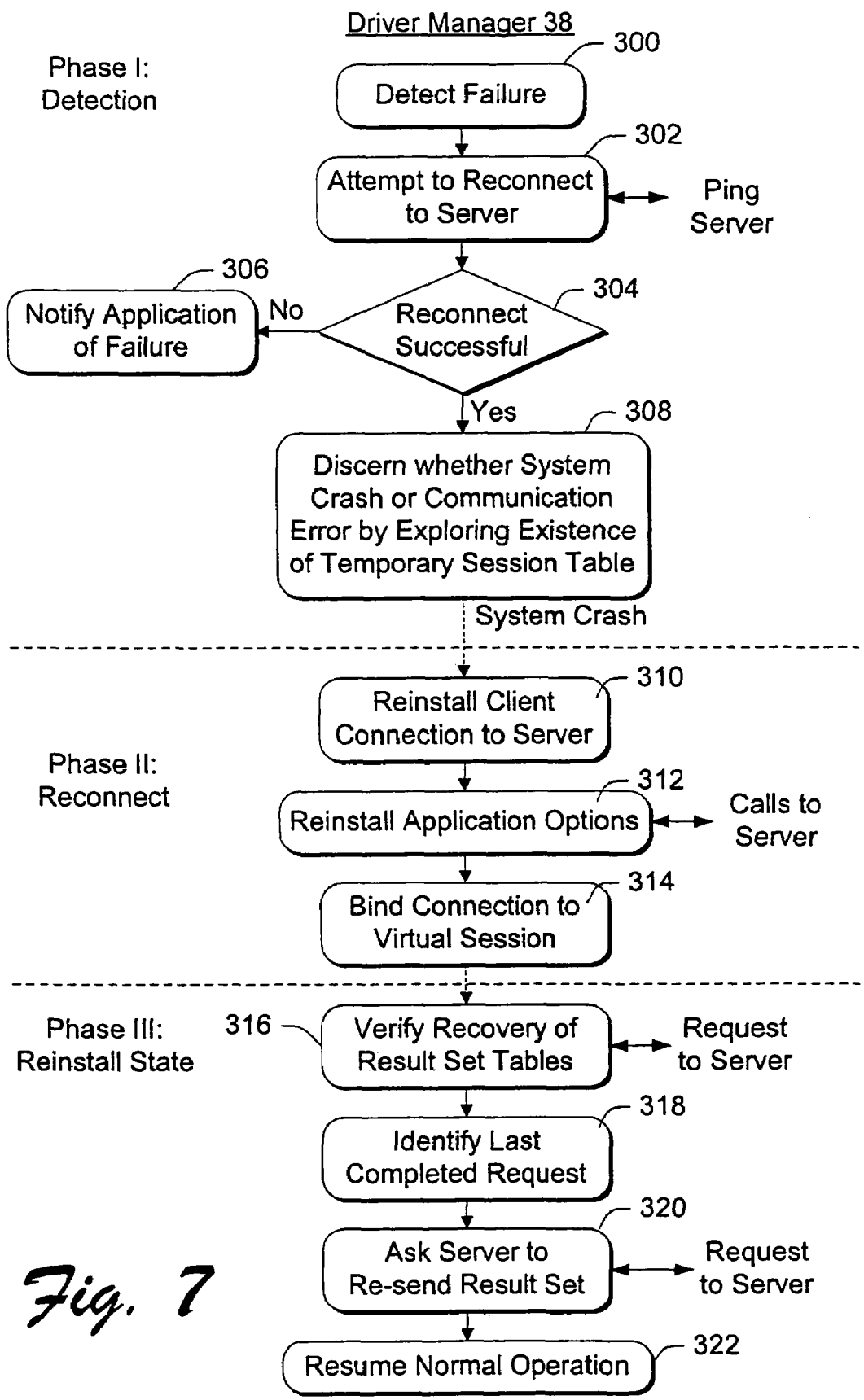
FIG. 7 is a process performed by the client during recovery from a server crash.

FIG. 7 shows a recovery process implemented by the client server architecture 30. The process is separated into three phases: a failure detection phase, a reconnection phase, and a state reinstallment phase. Assuming the failure is a result of a server crash, the last two phases form a recovery stage of the process. The process is performed in software at the client, and namely in the driver manager 38.

At step 300, the driver manager 38 detects a failure. Database server failures are detected by (i) intercepting communications errors raised by the drivers 36 or (ii) timing out application requests. Once a potential problem is detected, the driver manager 38 re-contacts the server using a private database connection to "ping" the server and periodically attempts to reconnect to the database (step 302). If after a period of time the driver manager is unable to connect to the server (i.e., the "no" branch from step 304), it assumes the database system crashed and passes the communication error on to the application (step 306).

If reconnection is successful (i.e., the "yes" branch from step 304), the driver manager 38 determines if the database system actually crashed or whether there is simply a communication failure or delay (step 308). This step attempts to discover whether the database session still exists or has been erased by a crash. There is no explicit test for this. Thus, the driver manager may test, for example, whether a special temporary table of the session exists as a proxy for whether the session still exists. Temporary tables exist only within a session and are deleted when a session terminates for any reason.

Assuming the proxy test reveals a server crash (e.g., the temporary table does not exist), the second phase of the process is to transparently reconnect the client application to the database server 24 and re-associate saved information with these new database connections. At step 310, the driver manager 38 reinstalls each client connection to the database system using the original connection request and login information. The manager 38 then issues a series of calls to the database server in order to reinstall application specified ODBC connection options (step 312). Once complete, the driver manager 38 binds these new connections to the virtual database session (step 314).

In the third phase, the driver manager 38 reinstalls SQL state. At step 316, the manager 38 verifies that all application state materialized in tables on the persistent database 28 was recovered by the database recovery mechanisms. It then identifies the application's last completed request for each database connection using the log 48 in the stable cache 46 (step 318). The manager 38 asks the server to re-send the result set from the persistent result set table 44 (if necessary) (step 320). Once this step is complete, the driver manager 38 resumes normal processing of application requests (step 322). This creation of the new database session is masked from the application, giving the illusion of a single persistent database session.

No special treatment is required to handle a failure that occurs during session recovery. Since the database session recovery phase consists of reestablishing a connection to the recovered database server and executing idempotent operations to reinstall session state, the driver manager 38 can safely execute the recovery phase again to recover from failure.

Any active transactions on the database server are aborted during failure and are restarted by the client application. Transaction failure is a normal event that most applications are already capable of handling. The driver manager 38 aborts transactions interrupted by a system failure and permits the application to proceed as it would for other forms of transaction aborts.

When the database server commits a transaction and then fails before it can send a response to the client, that message will be lost to the client. The driver manager 38 prevents lost messages by including the transaction reply buffers in its persistent session context. The database server writes both the commit record and reply buffer to a persistent database table before committing the transaction and replying to the client. On database recovery, the driver manager 38 will deliver the reply buffer to the client, thus avoiding the lost message.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. In a client-server database system having a client and a database server, a computer-implemented method comprising:
   intercepting a client request destined for the database server as the client request is passed from an application layer to a database driver layer at the client; and
   modifying, at the client, the client request to form a modified request that directs the database server to render a session state persistent at the database server.

2. A computer-implemented method as recited in claim 1, further comprising processing the modified request at the server to preserve results produced from processing the client request.

3. A computer-implemented method as recited in claim 1, wherein the client request is a query for a database table, and the modifying comprises rewriting the query to form a modified query that obtains format information on a result set produced as a result of processing the query.

4. A computer-implemented method as recited in claim 3, further comprising:
   processing the modified query at the server and returning the format information to the client;
   sending a create table request to the database server to create a persistent table according to the format information; and
   creating the persistent table at the database server in response to the create table request.

5. A computer-implemented method as recited in claim 4, further comprising: submitting the query; processing the query to produce the result set; and storing the result set in the persistent table.

6. A computer programmed to perform the method as recited in claim 1.

7. One or more computer-readable media having computer-executable instructions that, when executed by one or more processors, perform the method as recited in claim 1.

8. In a client-server database system having a client and a database server, the client implementing a software architecture having a database driver layer, an intermediate driver manager layer, and an application layer, a computer-implemented method implemented at the intermediate driver manager layer comprising:
   creating a virtual session;
   mapping the virtual session onto a database session established by the database driver layer;
   exposing the virtual session to the application layer; and
   in an event of a system failure, reassociating the virtual session with a new database session established at the database driver layer so that recovery is transparent to the application layer and the database driver layer.

9. A computer-implemented method as recited in claim 8, further comprising altering requests made by the application layer to transition from the virtual session to the database session.

10. One or more computer-readable media having computer-executable instructions that, when executed by one or more processors, perform the method as recited in claim 8.

* * * * *